(12) United States Patent
Johnsen et al.

(10) Patent No.: US 10,327,295 B2
(45) Date of Patent: Jun. 18, 2019

(54) MULTI STRING CONTROLLER WITH INDEPENDENT CURRENT SETTING FOR EACH STRING

(71) Applicant: OSRAM SYLVANIA Inc., Wilmington, MA (US)

(72) Inventors: Andrew Johnsen, Danvers, MA (US); Keng Chen, Sudbury, MA (US); Ming Li, Acton, MA (US); Peng Xiao, Andover, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 16/061,338

(22) PCT Filed: Dec. 12, 2016

(86) PCT No.: PCT/US2016/066229
§ 371 (c)(1),
(2) Date: Jun. 11, 2018

(87) PCT Pub. No.: WO2017/100793
PCT Pub. Date: Jun. 15, 2017

(65) Prior Publication Data
US 2019/0045595 A1    Feb. 7, 2019

Related U.S. Application Data

(60) Provisional application No. 62/265,967, filed on Dec. 10, 2015, provisional application No. 62/270,949, filed on Dec. 22, 2015.

(51) Int. Cl.
*H05B 37/00*    (2006.01)
*H05B 33/08*    (2006.01)

(52) U.S. Cl.
CPC ..... *H05B 33/0827* (2013.01); *H05B 33/0812* (2013.01); *H05B 33/0815* (2013.01)

(58) Field of Classification Search
CPC .. H05B 41/28; H05B 41/295; H05B 41/2827; H05B 41/3925; H05B 33/0815;
(Continued)

(56) References Cited

U.S. PATENT DOCUMENTS

2003/0025120 A1    2/2003  Chang
2008/0116818 A1    5/2008  Shteynberg et al.
(Continued)

FOREIGN PATENT DOCUMENTS

CN    102821526 B    9/2015
DE    102007047725 A1    4/2009
(Continued)

OTHER PUBLICATIONS

Müller, Uta, International Search Report and Written Opinion of the International Searching Authority, for counterpart application PCT/US2016/066229, dated Mar. 29, 2017, European Patent Office, Rijswijk, The Netherlands, 19 pages.

*Primary Examiner* — Minh D A
(74) *Attorney, Agent, or Firm* — Shaun P. Montana

(57) ABSTRACT

A multi string controller with independent current setting for each string is designed for solid state lighting applications. This controller can regulate multiple channels of LEDs. Each string may have a different forward voltage and current setting. A constant buck regulator is also integrated inside this controller to regulate the total current, which is fed into the LED output channels. The circuit also contains a feedback loop in order to precisely control the current passing through each string and is immune to transient conditions.

16 Claims, 20 Drawing Sheets

(58) Field of Classification Search
CPC ............ H05B 33/0818; H05B 41/2828; H05B 41/3921; H05B 41/3927; H05B 37/029; H05B 37/02; H05B 37/0254; H05B 33/0803; Y02B 20/202; F21Y 2101/02
See application file for complete search history.

(56) References Cited

U.S. PATENT DOCUMENTS

| | | |
|---|---|---|
| 2009/0187925 A1 | 7/2009 | Hu et al. |
| 2010/0109563 A1 | 5/2010 | Gong et al. |
| 2011/0032244 A1 | 2/2011 | Kataoka et al. |
| 2012/0194079 A1* | 8/2012 | Clauberg ........... H05B 33/0815 315/125 |

FOREIGN PATENT DOCUMENTS

| | | |
|---|---|---|
| DE | 102011055528 A1 | 7/2012 |
| EP | 1691580 A1 | 8/2006 |
| KR | 101028860 B1 | 4/2011 |
| WO | 2004100614 A1 | 11/2004 |
| WO | 2009122488 A1 | 10/2009 |
| WO | 2012140634 A1 | 10/2012 |
| WO | 2013027886 A1 | 2/2013 |
| WO | 2015039041 A1 | 3/2015 |

* cited by examiner

MULTI STRING CONTROLLER WITH INDEPENDENT CURRENT SETTING FOR EACH STRING

CROSS-REFERENCE TO RELATED APPLICATIONS

The present application is a National Stage application of, International Application No. PCT/US2016/066229, filed Dec. 12, 2016, which claims priority of, and the benefit of, U.S. Provisional Patent Application No. 62/265,967, filed on Dec. 10, 2015, and U.S. Provisional Patent Application No. 62/270,949, filed on Dec. 22, 2015, the entire contents of both of which are hereby incorporated by reference.

TECHNICAL FIELD

The present invention relates to electronics, and more specifically, to controller circuits and controllers.

BACKGROUND

In the past two decades, solid-state lighting technology has grown rapidly. Due to its high efficacy, long lifetime, and good color quality, the light-emitting diode (LED) has been used in both indoor and outdoor lighting applications. As the power of LED fixtures increases, more and more diodes are put onto a single LED light engine. Moreover, in order to generate high CRI (color rendering index) and high efficacy (lm/W) white light, multi-spectral LEDs clusters, which include both phosphor-converted white LEDs and single-color diodes, are used. The main reason for using multi-spectral LED clusters is that phosphor-converted white LEDs with high correlated color temperature (CCT, ~5000K) show good efficacy compared to those with a lower CCT (~2700K), but the color rendering index of the higher CCT LED is worse than that of the lower CCT LED. The high CCT phosphor-converted white LED lacks high wavelength energy in its spectrum; therefore, in order to compensate for this weakness while still maintaining high efficacy, a red LED can be added into the light engine to improve color rendering. There are several challenges to driving LED light engines containing diodes of different color. First, the forward voltages of the LEDs having different colors are not the same. GaN material is used to make phosphor-converted white LEDs, while red or orange LEDs are usually made from AlGaInP. The material bandgap for these two types of semiconductor are different. It is very difficult to maintain forward voltage balancing while driving these LEDs in different chains without regulation. Second, for a color-mixing LED light engine, not all LEDs will be driven at the same current. In order to achieve a certain color temperature as well as maintain high efficacy, the current pass through the phosphor-converted white LED will need to be larger than the current pass through other single-color diodes.

A multi-channel LED driver is required to solve these challenges. Much work has been done in the past on multi-channel drivers, both in academia and industry. Among these designs, in order to drive multiple channel outputs the power converter either requires all the output channels to share the same regulation, which means every output channel has an identical output current; or each output channel requires a subpower conversion system to regulate the output current separately, in which, for example, three output channels require three sets of power inductors, power diodes, and capacitors. For a color-mixing light engine design, it is required to have separate current regulation for each LED chain, but considering the cost efficiency it is much better for the design to eliminate as many power-conversion components as possible while still maintaining the independent current regulation among each output channel. In this study, a current-sharing topology was used. Table 2 compares the existing design methodologies with the topology presented in this study.

SUMMARY

Conventional mechanisms, such as those explained above, suffer from a variety of deficiencies. The current-sharing topology of the presently described multiple channel current sharing circuit is similar to some of the existing multichannel solutions, namely that the current passing through the LED strings is from one common constant current source. However, among those designs, the control MOSFET/Transistor is operated in the linear region, which will lead to lower efficiency compared to a switch mode power supply.

A multiple channel current sharing controller is designed for LED lighting application. This controller can regulate three channels of LEDs. Each LED string may have a different forward voltage and current setting. A constant buck regulator is also integrated inside this controller to regulate the total current, which is fed into three LED output channels. The circuit also contains a feedback loop in order to precisely control the current passing through each LED string and is immune to transient conditions. The start-up procedure is designed to ensure both acceptable overshooting of output current and that the turn on time is as short as possible. In the final simulation, the maximum output current overshooting and ripple under transient condition do not exceed 20% of the nominal value. The output current buildup time is less than 25 ms for all three channels.

In an embodiment, there is provided a [insert proseification of the claims here].

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 1 shows] according to embodiments disclosed herein.

FIG. 1 depicts a schematic diagram of a multiple channel current sharing circuit in accordance with embodiments of the present invention.

DETAILED DESCRIPTION

Figure 1:
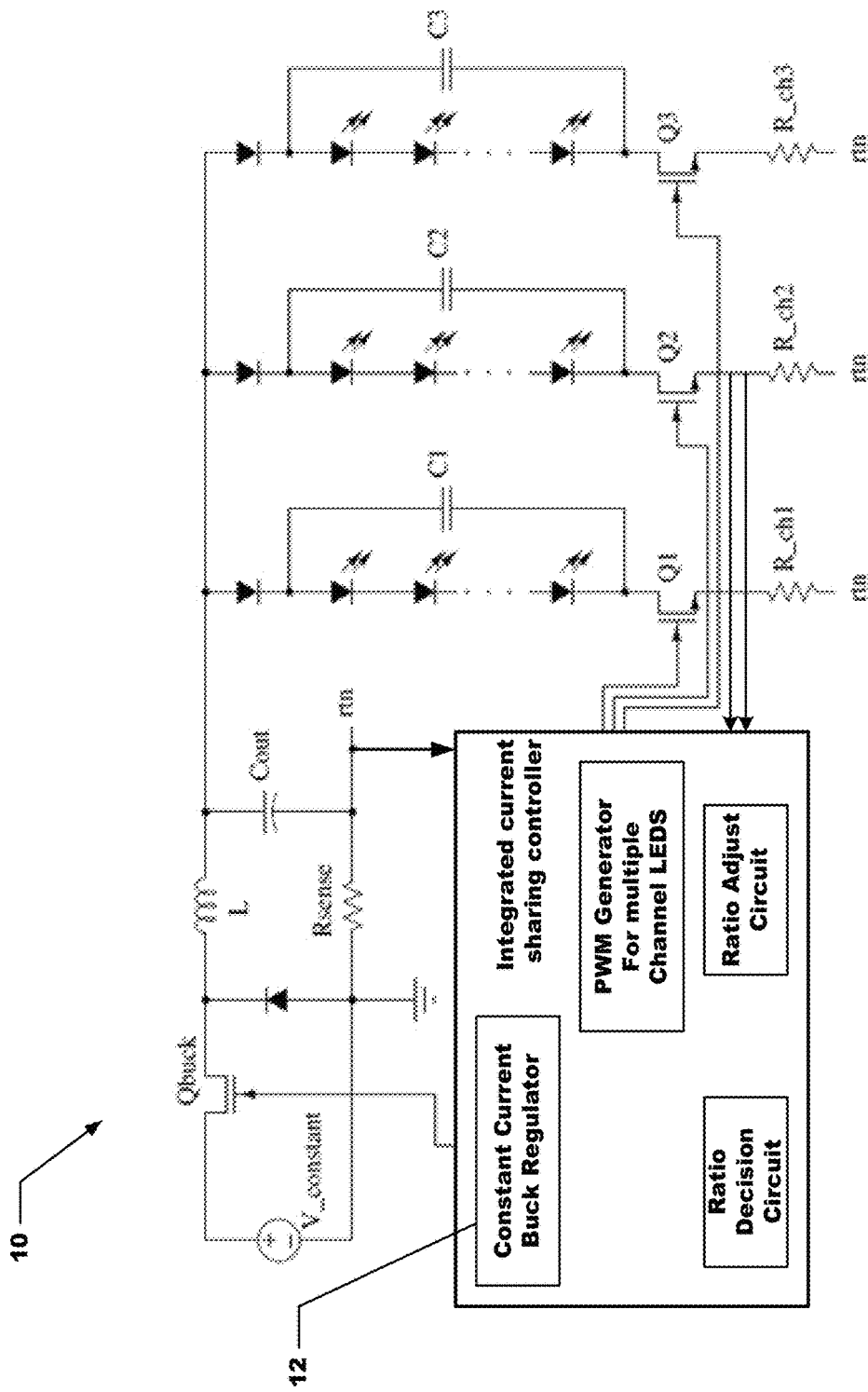
FIG. 1 shows a [what

Referring to FIG. 1, a schematic of a circuit 10 incorporating a current sharing controller 12 is shown. The control MOSFETs (Q1, Q2 and Q3) of each LED string, act as switches. Compared to a linear regulator, the loss is much smaller. From FIG. 1 it can be seen that three channels of LEDs share the same constant current from an integrated buck regulator 14. While three channels of LEDs are shown, it should be appreciated that any number of channels of LEDS could be used. The present description uses three channels as an example only, and is not intended to be limited to three channels. Each channel of LED is controlled separately; each channel can have different forward voltages as well as different current. The operation mode of each channel of LEDs is presented in FIG. 2. When the switching is on, the main current will pass through the LED and charge the capacitor in parallel connection with the load. The other two channels of LEDs are powered by the discharging current of the capacitors next to them. Unlike most commercial designs, the constant buck regulator 14 is also integrated inside the circuit. This integration improves the overall start-up performance and also reduces the cost compared to multi-chip solutions. Moreover, as presented in FIG. 2, although there are three output LED strings, the whole system requires only one set of power inductor L, Cout, and freewheeling diode D1. Compared to traditional multi-channel designs, the current-sharing topology is cost efficient. The overall efficiency will increase with the load current. Generally speaking, for a constant buck regulator the best efficiency will occur at maximum allowable load voltage with maximum load current. This rule applies to this design as well. The current ratio between each channel and the forward voltage of each LED string will also affect the overall efficiency value.

The design of output capacitor C1, C2, and C3 should consider switching frequency, hold up time, and power consumption of the LED load connected in parallel with it. As described before, when one of the three channels is connected to the main constant current buck output, the other two strings will be powered by these capacitors only, and moreover, the LED is also very sensitive to forward voltage. If the capacitance is too small in reference to the load size and switching frequency, the voltage will drop greatly and cause large output current ripple. Equations 1 and 2 explain the relationship. Although independent leds strings have a ripple current limit this will not be a requirement if all led strings are in the same fixture and are switching above 2K Hz. In this case C1,2,3 can be eliminated.

$$W_{hold\_up} = \frac{1}{2}(V^2_{forward\_nominal} - V^2_{drop\_target}) \cdot C_{1,2,or\,3} \quad (1)$$

$$C_{1,2,or\,3} = \frac{2 \cdot P_{1,2,or\,3} \cdot D'}{f_{SW} \cdot (V^2_{forward\_nominal} - V^2_{drop\_target})} \quad (2)$$

Where:

Whold_up: energy required to hold up the LED forward voltage and also provide load current; Vforward_nominal: LED nominal forward voltage; Vdrop_target: target voltage of load forward voltage drop under worst condition; P1, 2, or 3: channel 1, 2, or 3 nominal output power; D': off duty cycle of channel 1, 2, or 3.

In order to make three channels of LEDs with different forward voltages to have independent current control, the on-time for Q1, Q2, and Q3 should not have any overlap. As a result, the current ratio between each channel depends on the on-time of each MOSFET; moreover, considering the situation in which one channel has the largest number of LEDs (maximum forward voltage), the power MOSFET for this LED channel can be eliminated. For example, if the third LED channel has the largest forward voltage, Q3 can be eliminated. When Q1 is on while Q2 is off, since the forward voltage of the LEDs of the first channel is less than that of the third channel, all the current from the buck regulator will pass through channel one.

Figure 2A:
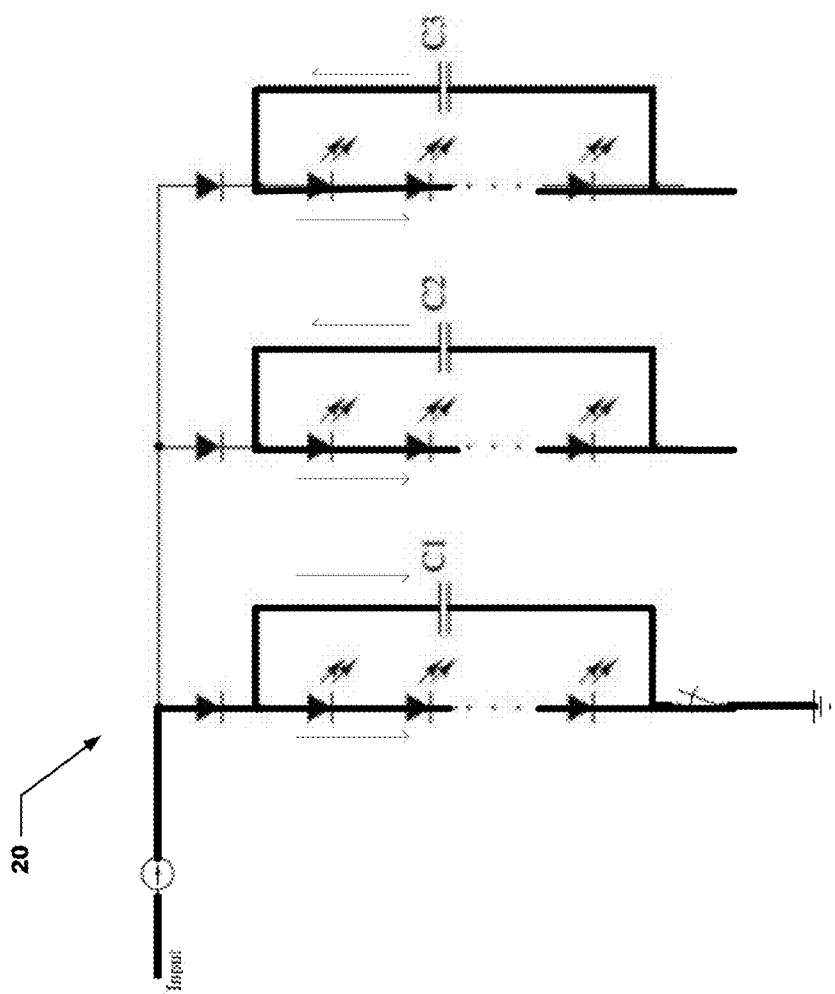
FIGS. 2A-2C depict schematics showing operation mode for each channel in accordance with embodiments of the present invention.
Figure 2B:
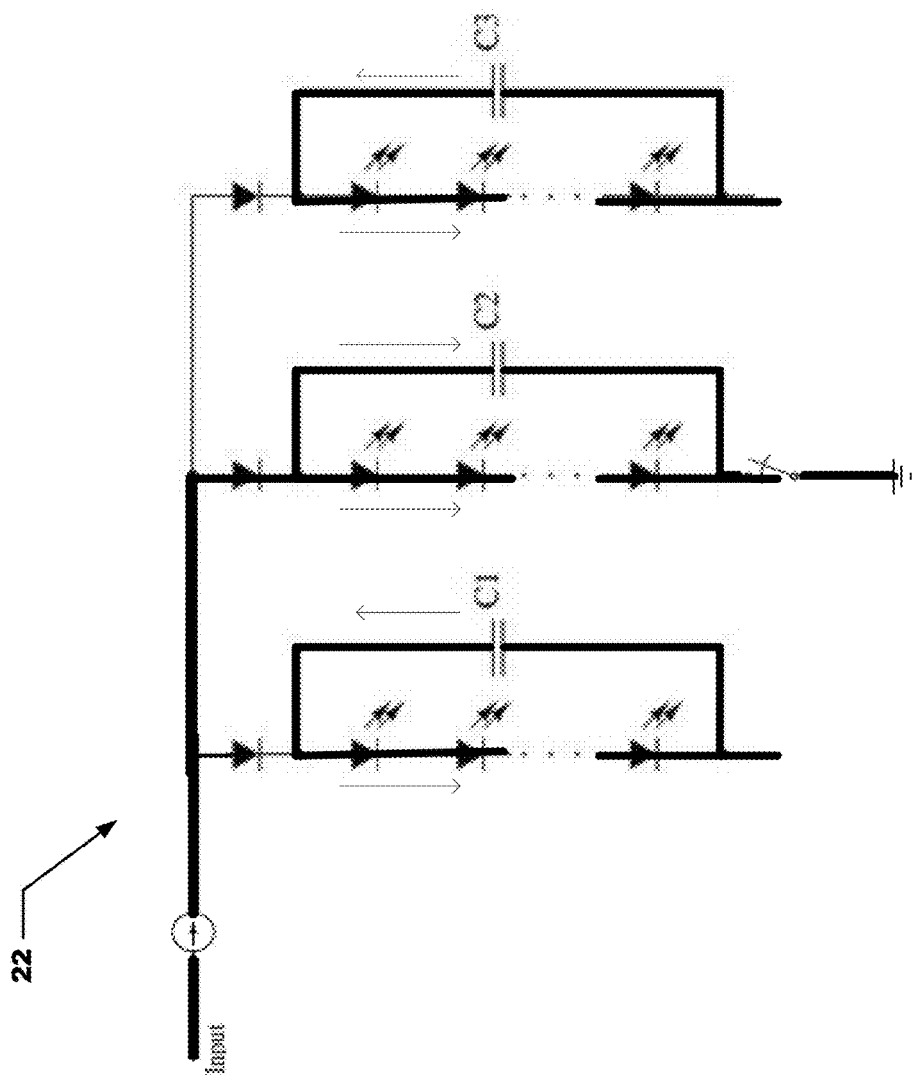
Figure 2C:
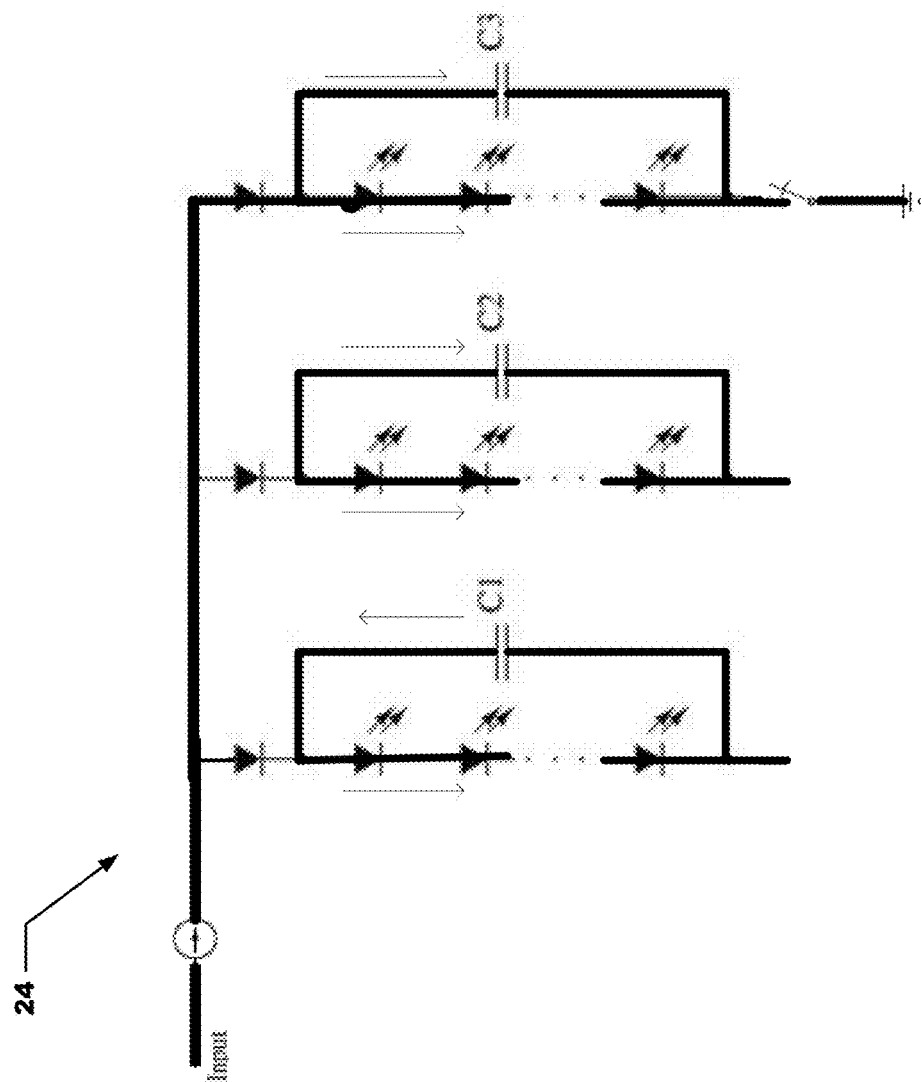

FIGS. 2A-2C show the operation mode of each LED string. When a channel is on (channel 1 in FIG. 2A, channel 2 in FIG. 2B and channel 3 in FIG. 2C), the buck drives the LEDs and charges the capacitor. For the channels that are not on the LEDs are not driven. The switches are controlled to turn a channel on or off, and are controlled in a manner wherein there is no overlap in on time between the channels.

Figure 3:
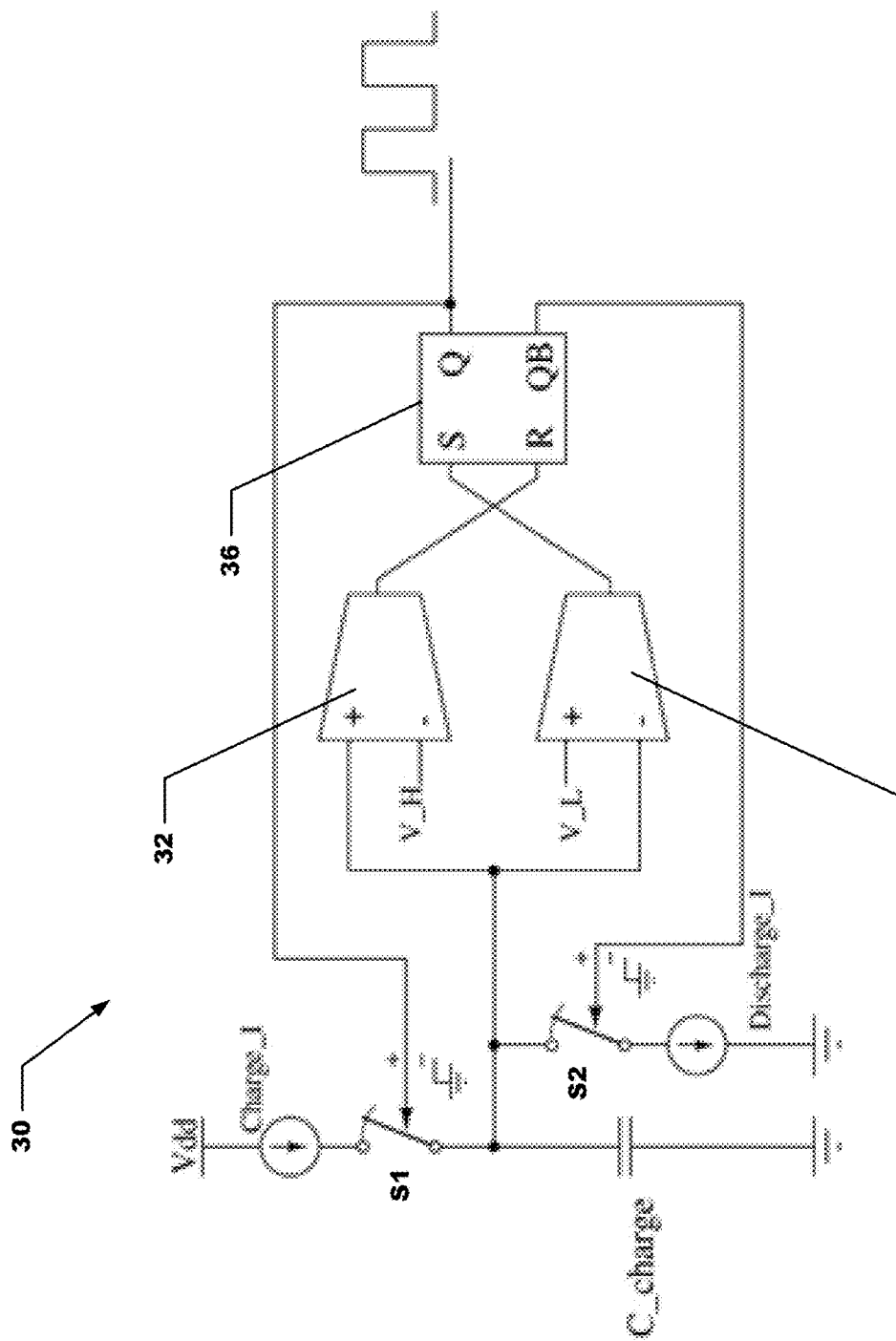
FIG. 3 depicts a schematic diagram of a PWM generator cell in accordance with embodiments of the present invention.

The single PWM generator cell 30 is presented in FIG. 3. When the charging switch S1 is turned on, the current Charge_I will charge the capacitor C_charge until its voltage reaches V_H. Comparator 32 will then trigger the reset input on the flip flop 36, the QB port of SR flip flop 36 will be set to high and the Discharge_I will discharge the capacitor until V_L is achieved which will cause comparator 34 to trigger the set input of flip flop 36 and then start another cycle. The duty cycle of this PWM generator cell depends on the charging current, discharging current, and the value of the capacitor. In order to generate a three-channel PWM signal without any overlap, three PWM generator cells should be used. Each PWM signal has a different duty cycle, which means the charge current should be varied by the channel as well. The charging network and three PWM generation circuit are presented in FIG. 4 and FIG. 5.

Figure 4:
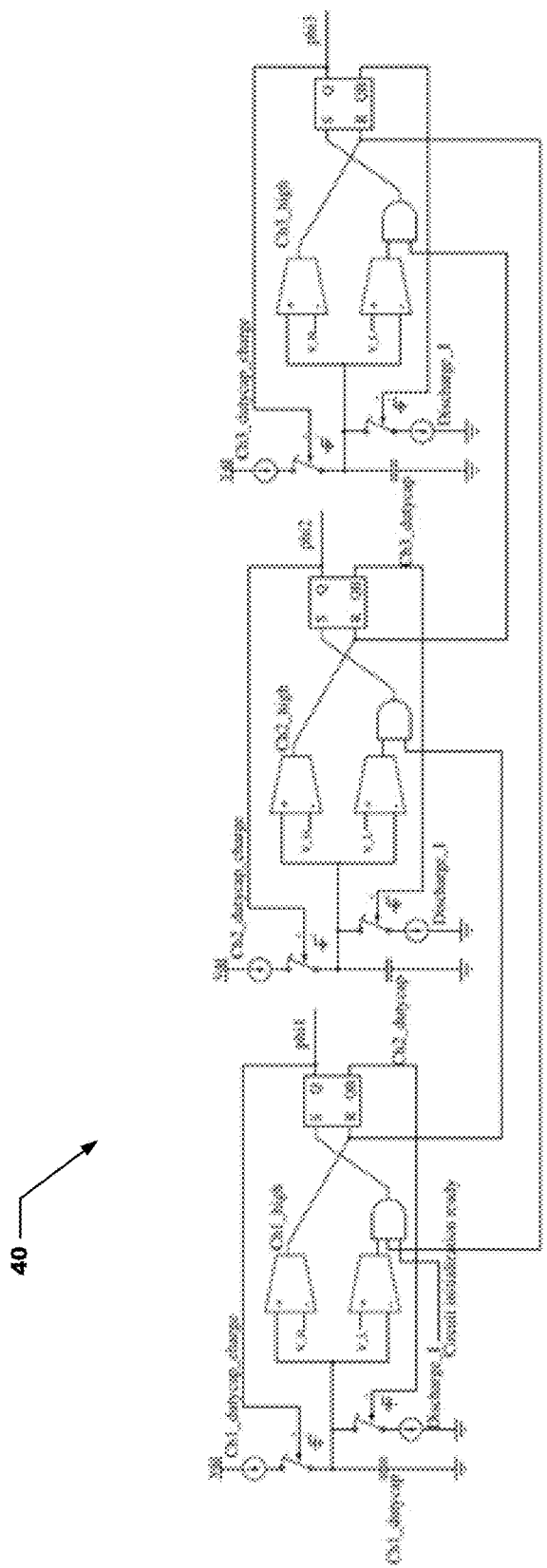
FIG. 4 depicts a schematic of a three PWM generation circuit in accordance with embodiments of the present invention.

As shown in FIG. 4, when the system 40 is powered up, signal phi 1 will be set to high after the circuit initialization ready is true; then current source Ch1_dutycap_charge will charge the Ch1_dutycap while signals phi 2 and phi 3 remain low. When voltage across Ch1_dutycap reaches V_H, Ch1_high will become true and phi 2 signal will be pulled up high when phi 1 signal changes to low.

Because phi 1, phi 2, and phi 3 will be set to high in a continuous sequence without overlap, the duty cycle ratio of these signals totally depends on the charging current when all three charge capacitors have the same value. The circuit 50 in FIG. 5 will generate three different charging currents with certain ratio. It can be seen from FIG. 5 that U1, Q1-Q3, and R_total_ind will generate the reference current to present unit 1 or 100%. U2, Q4-Q8, and R_ch1_ind will generate current to the charge capacitor of channel 1, which will be used for the phi 1 signal. The value of this charging current should be less than the reference current. U3, Q9-Q13, and R_ch2_ind will generate channel 2's capacitor charging current. The summary of I_charge_ch1 and I_charge_ch2 should be less than the reference current as well. Q17-Q27 comprise the current deduction circuit to generate the charging current for the capacitor of channel 3. Q14-Q17 is a current mirror that copies the reference current. Q18-Q19 and Q22-Q23 copy the charge current of both channel 1 and channel 2. The duty cycle of each of these three PWM signals is presented in Equation 3 to Equation 8.

$$V_{Ch1dutycap} = \frac{I_{Ch1dutycapcharge}}{C_{Ch1dutycap}} \cdot t_{phi1on} \tag{3}$$

$$t_{phi1on} = \frac{V_{Ch1dutycap} \cdot C_{Ch1dutycap}}{I_{Ch1dutycapcharge}} \tag{4}$$

$$D_{phi1} = \frac{t_{phi1on}}{t_{phi1on} + t_{phi2on} + t_{phi3on}} \tag{5}$$

$$C_{Ch1dutycap} = C_{Ch2dutycap} = C_{Ch3dutycap} = C \tag{6}$$

$$D_{phi1} = \frac{\frac{1}{I_{Ch1dutycapcharge}}}{\frac{1}{I_{Ch1dutycapcharge}} + \frac{1}{I_{Ch2dutycapcharge}} + \frac{1}{I_{Ch3dutycapcharge}}} \tag{7}$$

$$I_{LED-channel1} = D_{phi1} \cdot I_{total} \tag{8}$$

Figure 5:
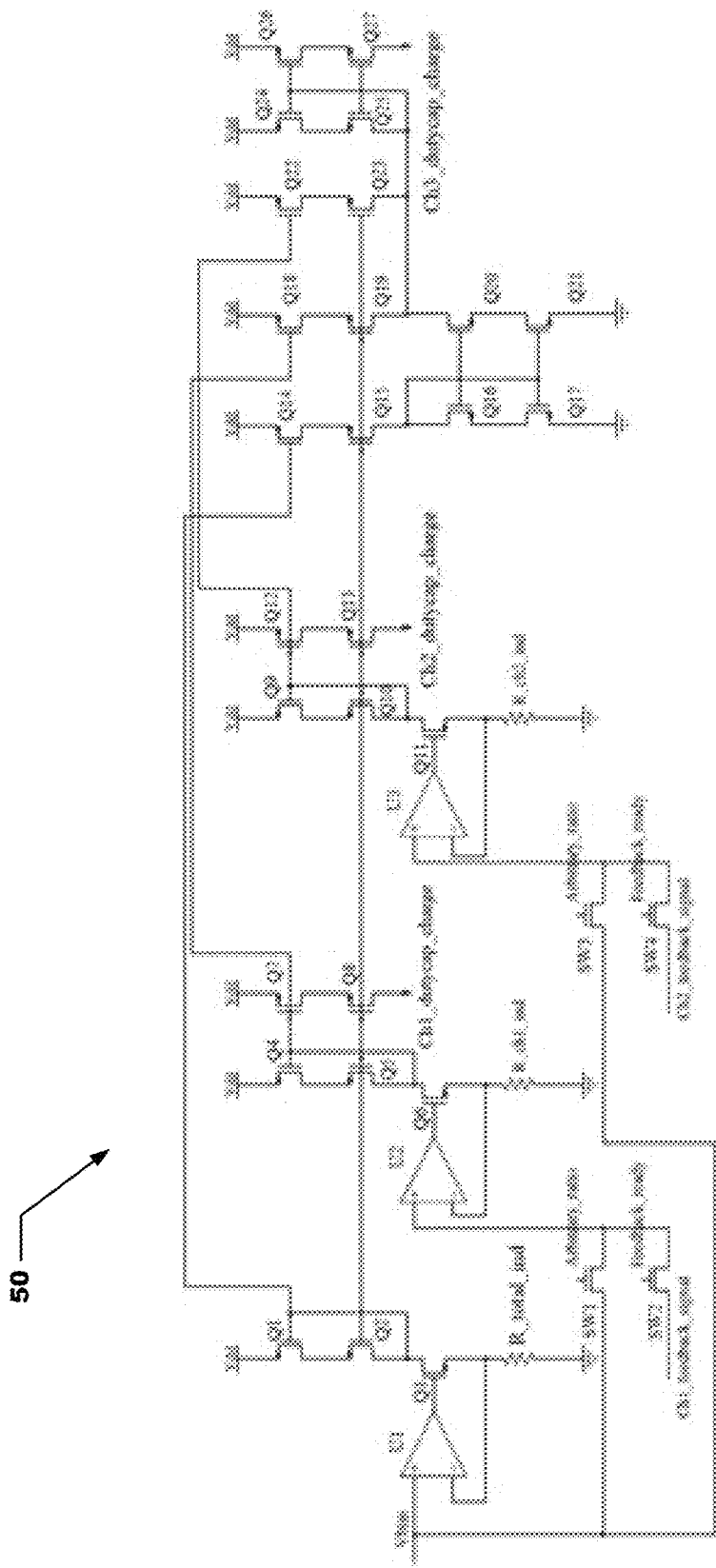
FIG. 5 depicts a schematic of a charging network in accordance with embodiments of the present invention.

Equation 8 shows that the ratio between the current passing through each LED channel depends on the duty cycle of these three PWM generators. The duty cycle of phi 1, phi 2, or phi 3 is decided by the charging current. FIG. 5, which presents the method of generating these charging currents, shows the port-to-connect feedback system. When the system is powered up, the charging current is set by the on-chip reference voltage Vref and the off-chip resistors (R_ch1_ind and R_ch2_ind). The arbitrary setup will provide a fast turn-on of each LED channel with the desired current ratio. However, because MOSFET mismatch exists in the current mirror circuit, the charging capacitors are not exactly identical in the three PWM generator systems, nor is the tolerance of the off-chip resistors identical. This preset charging current ratio may lead the current pass through each LED channel to deviate from the target value. In this case, a feedback circuit is required to correct these errors. Moreover, a feedback circuit will also improve the transient response of the current passing through each output channel. The feedback circuit 50 is presented in FIG. 5.

Figure 6:
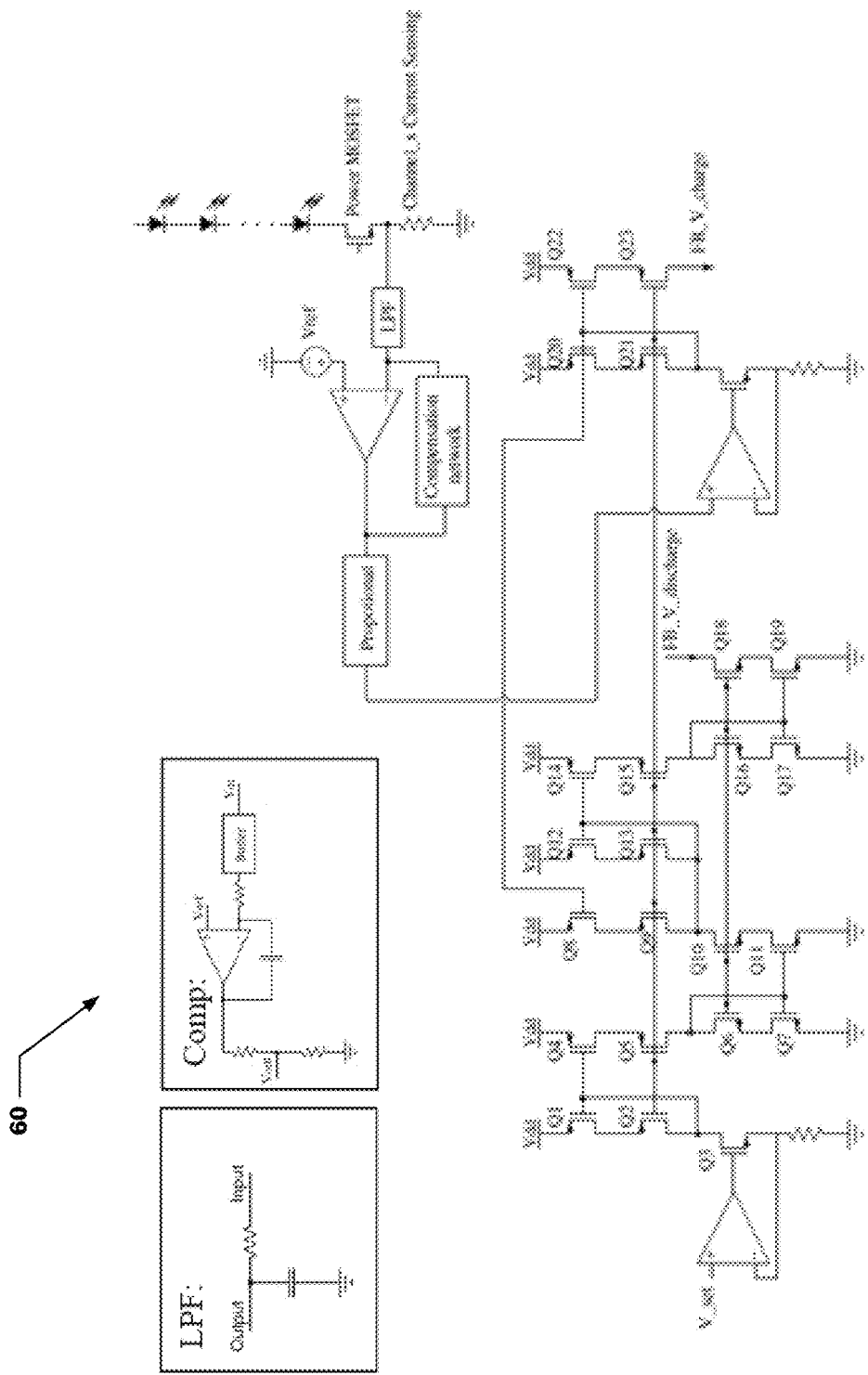
FIG. 6 depicts a schematic of a circuit that senses the LED current and also generates the charging/discharging current in accordance with embodiments of the present invention.
Figure 7:
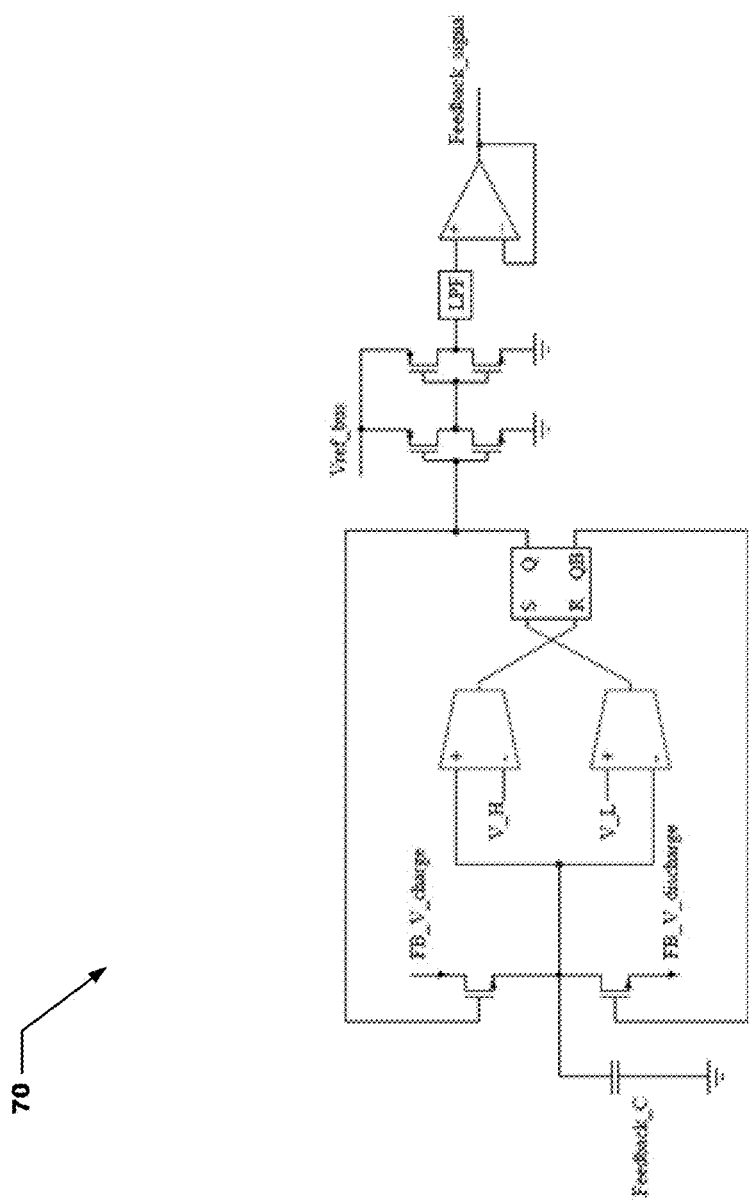
FIG. 7 depicts a schematic of the feedback circuit in accordance with embodiments of the present invention.

From FIG. 5, it can be seen that the feedback signal generator contains two parts. FIG. 6 shows the circuit 60 that senses the LED current and also generates the charging/discharging current for the circuit in FIG. 7. The low pass RC filter and type I compensation amplifier circuit are presented in FIG. 6 as well. In this design, all the low pass filters are RC circuit. Although a resistor will be greatly affected by PVT (process, voltage, and temperature), around 30% tolerance will be good enough for the purpose used in this design. As presented in both FIG. 5 and equation 7, the larger the charging current for the Chanelx_dutycap, the smaller the duty cycle will be, leading to a smaller current passing through this channel. In FIG. 6 and FIG. 7, the LED current of a certain channel is sensed by the Channel_x current sensing resistor (Rx), and through one low-pass filter and compensation network, the voltage is used to create current called IFB_V_charge_x. The larger the current sensing signal is compared to the reference voltage, the bigger the IFB_V_charge_x will be. The IFB_V_discharge_x is generated through a current deduction circuit. When the LED current is less than the target value, the IFB_V_charge_x will increase and the IFB_V_discharge_x will decrease. This will reduce the charging time of Feedback_C (Cfb). Under this condition, the on-time of the Q port will become smaller, which will cause the Feedback signal to reduce. With a smaller Feedback signal value, the IChannel_x_dutycap_charge will decrease, causing the duty cycle of this channel to increase and finally boost up the LED current. Equations 9 through 17 present the feedback signal calculation.

$$V_{sns\_x} = I_x \cdot R_x \cdot \frac{1}{1 + \frac{s}{\omega_0}} \cdot \frac{\omega_1}{s} \cdot A_p \tag{9}$$

$$\frac{V_{sns\_x}}{R_{fb}} = I_{FB\_V\_charge\_x} \tag{10}$$

$$\frac{V_{set}}{R_{set}} = I_{FB\_V\_charge\_x} + I_{FB\_V\_discharge\_x} \tag{11}$$

$$I_{FB\_V\_discharge} = \frac{V_{set}}{R_{set}} - \frac{V_{sns\_x}}{R_{fb}} \tag{12}$$

$$t_{on\_fb} = \frac{V_H \cdot C_{fb}}{I_{FB\_V\_charge\_x}} \tag{13}$$

$$t_{off\_fb} = \frac{V_H \cdot C_{fb}}{I_{FB\_V\_discharge\_x}} \tag{14}$$

$$T_{fb} = t_{on\_fb} + t_{off\_fbq} \tag{15}$$

$$V_{FB\_signal\_x} = \frac{t_{on\_fb}}{T_{fb}} \cdot V_{ref\_bus} \tag{16}$$

$$I_{Ch\_x\_dutycapcharge} = \frac{V_{FB\_signal\_x}}{R_{ch\_x\_ind}} \tag{17}$$

Where:
Ix: LED forward current passing through channel x; Rx: channel x current sensing resistance; Vsns_x: voltage sent to the compensation network; Vset, Rset: voltage and resistor used to set reference main current; Rfb: based on Vsns_x define the current charging feedback capacitor Cfb; IFB_V_Charge_x: current charging feedback capacitor Cfb; IFB_V_discharge_x: current discharging feedback capacitor Cfb; ton_fb: on-time of feedback capacitor; toff_fb: off-time of feedback capacitor For a three-channel current-sharing circuit design, only two channels require a feedback system. The last channel will take over whatever current remains from the total output of the constant current buck regulator.

In order to improve the system's start-up performance, the buck regulator is designed as part of this control IC. The system schematic 80 for this integrated buck regulator is shown in FIG. 8.

Figure 8:
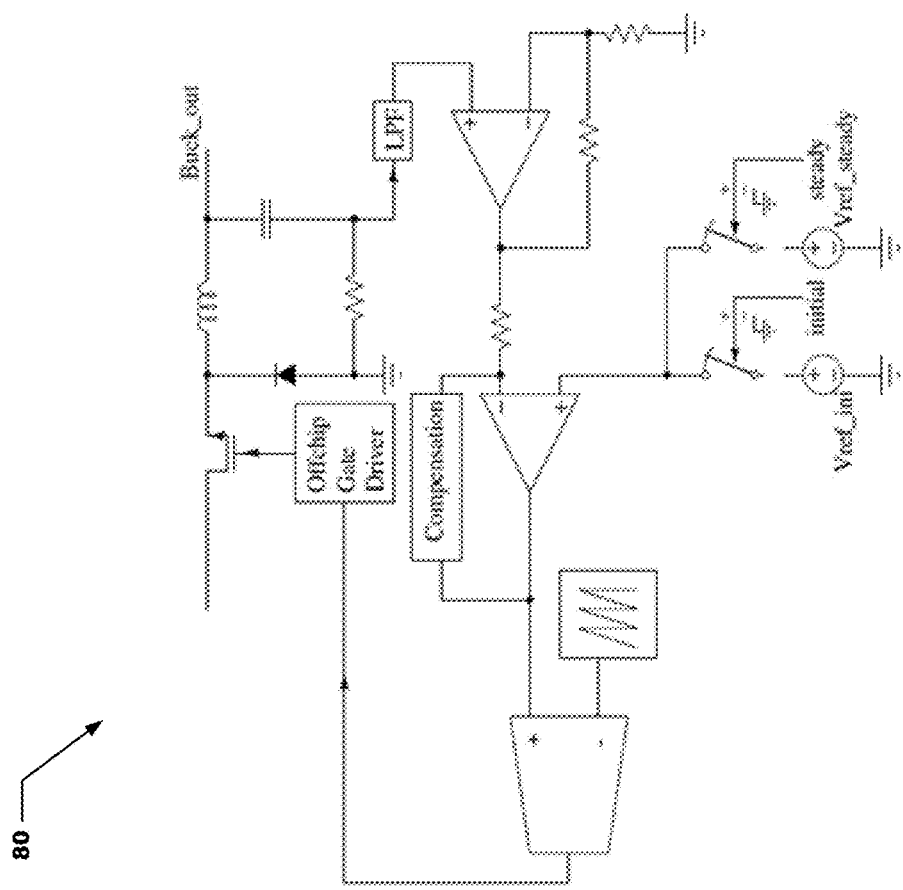
FIG. 8 depicts a schematic diagram of the integrated buck regulator in accordance with embodiments of the present invention.

As presented in FIG. 8, the voltage on the current sensing resistor will first pass through a low-pass filter and then be amplified before reaching the compensation network. For the reference voltage, when the unit starts up, a small value will be used in order to improve the start-up performance, then a final value will be used for the steady-state operation.

A simulation was conducted for this circuit. In the simulation, both channel 1 and channel 2 have 21V forward voltage, and channel 3 has 32V forward voltage. As channel 3 has the largest forward voltage, the MOSFET of channel 3 can be eliminated. The current ratio of each channel is set to 4:2:3, and the total current from the buck regulator is set to 1200 mA. The off-chip power train components are listed in Table 3 and the results are presented in FIG. 9.

Figure 9:
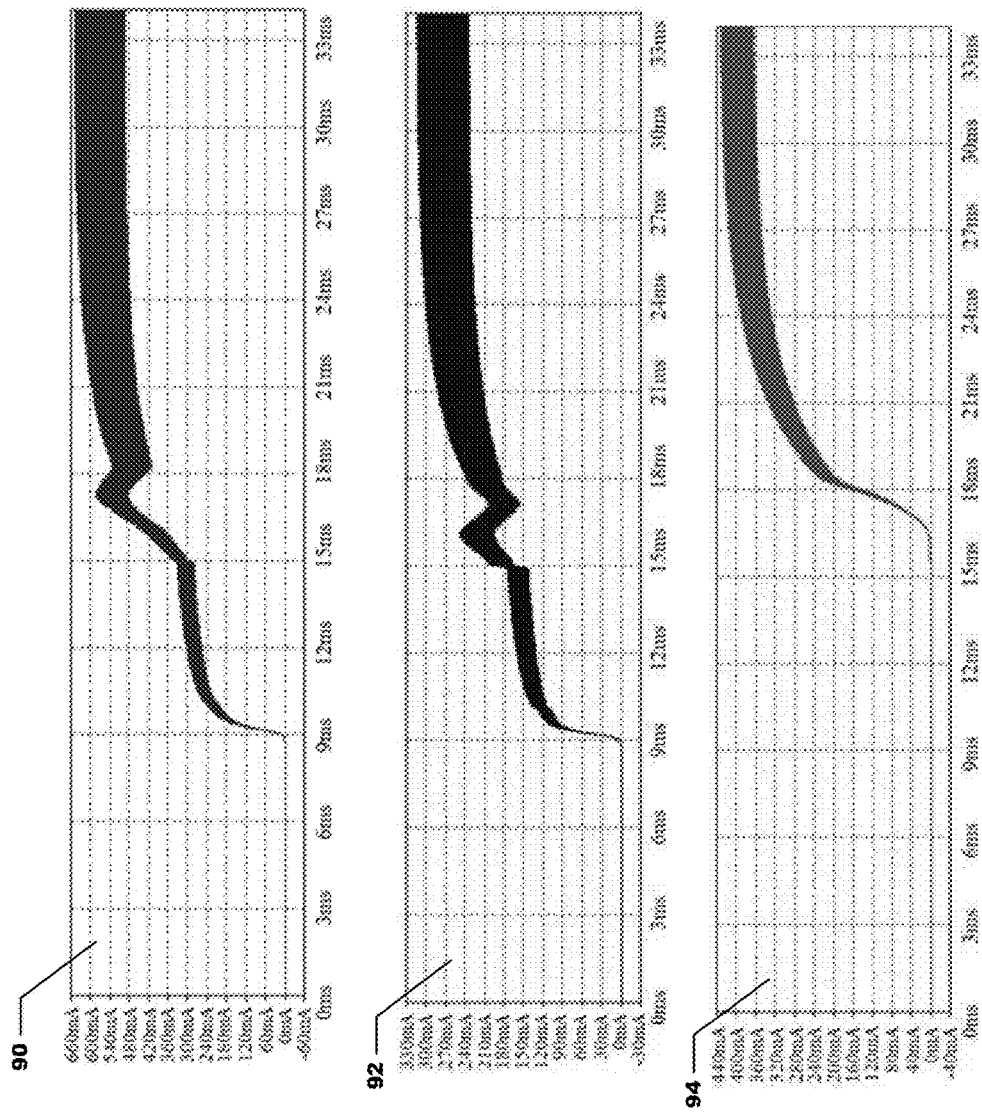
FIG. 9 depicts graphs showing the channel LED currents in accordance with embodiments of the present invention.

FIG. 9 shows the Channel 1 LED current 90; the Channel 2 LED current 92 and the Channel 3 LED current 94. From FIG. 9, it can be seen that the LED current started to build up at 9 ms. There was current passing through both channel 1's and channel 2's LEDs at the same time. The LEDs on channel 3 started at almost 15 ms. The difference in the turn-on time was due to the LED forward voltage. Because the LED chain of channel 3 had the largest forward voltage, it required a longer time for the current to charge up the voltage of C3 (shown in FIG. 1) to achieve the threshold voltage. FIG. 9 also shows output current disturbance when the feedback regulation kicked in; due to the integrated buck regulator applying a smaller reference voltage during start-up, the overshooting of the output current caused by the feedback system was lower than the nominal output current.

Figure 10A:
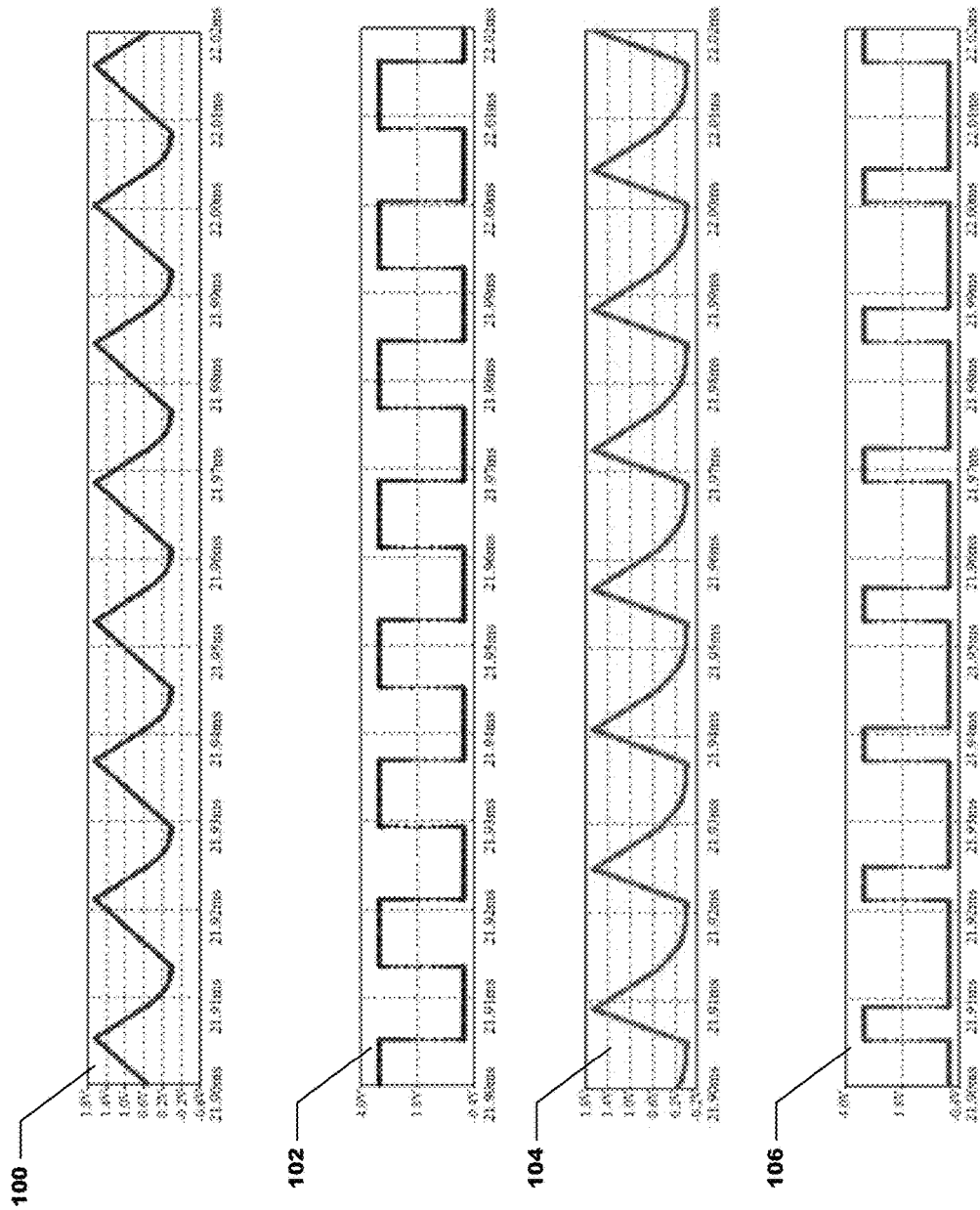
FIGS. 10A and 10B depict graphs showing the voltage across channel charging capacitors and PWM signals for channel LEDs in accordance with embodiments of the present invention.
Figure 10B:
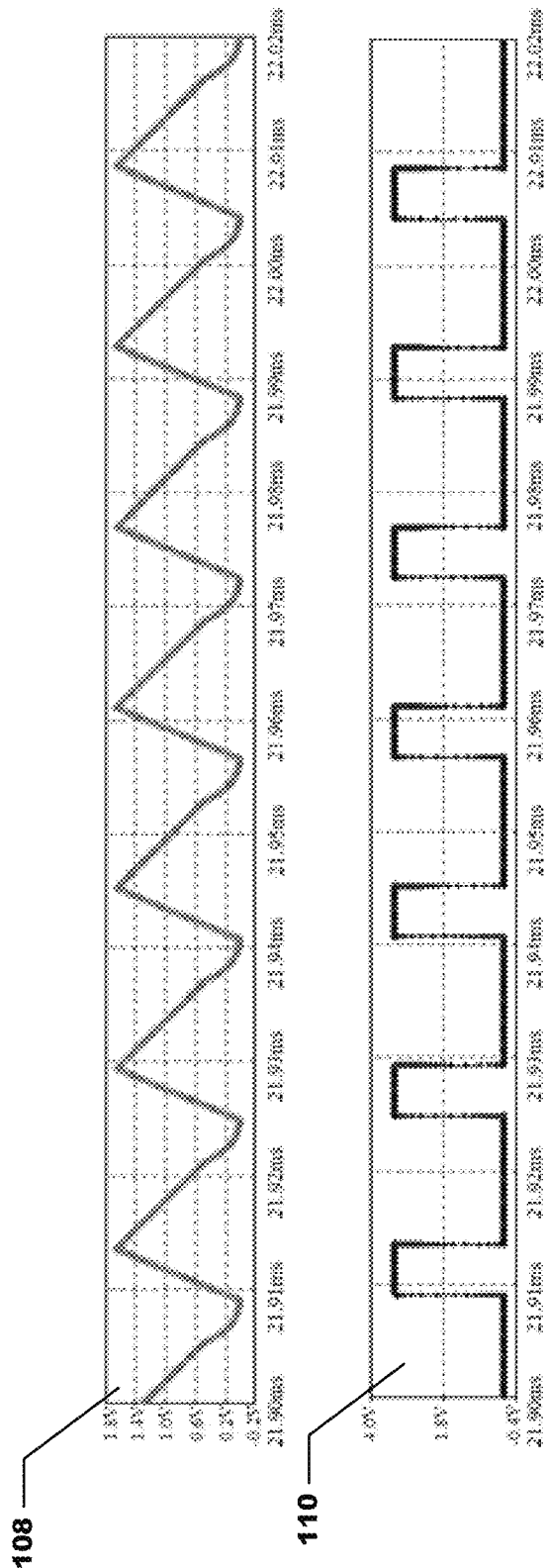

FIGS. 10A-10B presents the PWM signal of all three output channels and the voltage across each Chx_dutycap. From FIG. 10A and FIG. 10B, it can be seen that the three PWM signals 102, 106 and 110 do not have any overlap.

In FIGS. 10A and 10B, waveform 100 represents the voltage across channel 1 charging capacitor and signal 102 the PWM signal for channel 1 LED; waveform 104 represents the voltage across channel 2 charging capacitor and signal 206 the PWM signal for channel 2 LED; and waveform 108 represents the voltage across channel 3 charging capacitor and signal 110 the PWM signal for channel 3 LED.

Figure 11:
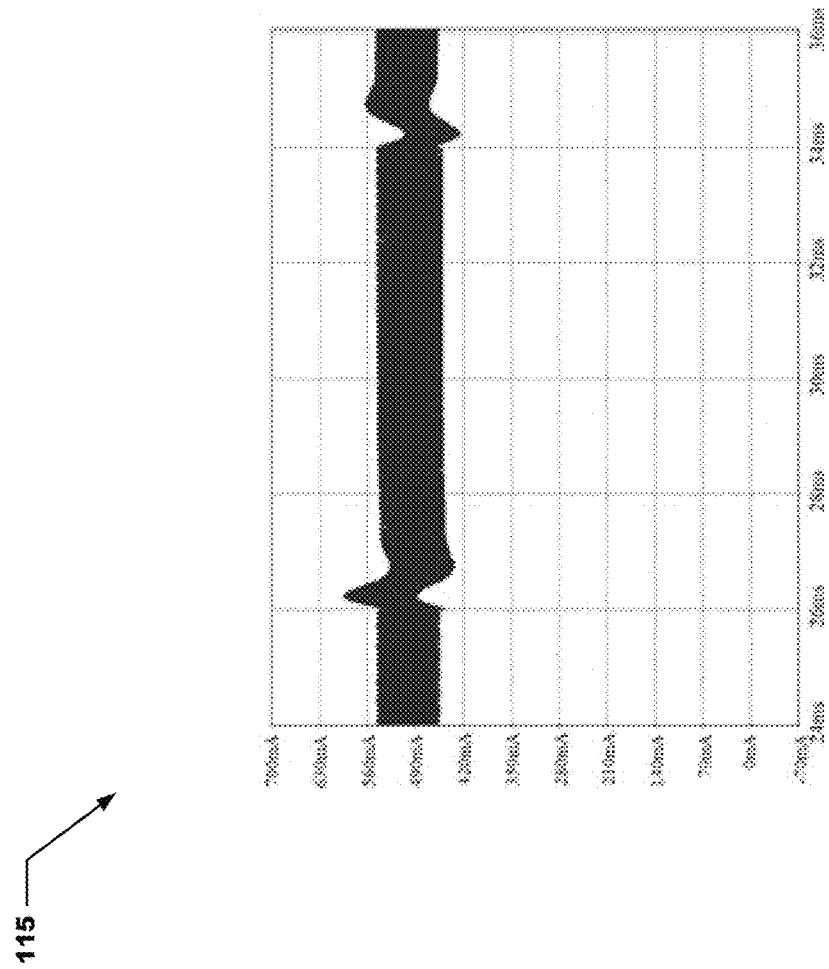
FIG. 11 depict a graph showing the channel LED currents in accordance with embodiments of the present invention.

The perturbation condition was also simulated to test the feedback circuit. One of the channels with feedback regulation was set to have 500 mA current, then a step change in the input current with the step level being 125% nominal target value. The result is presented in FIG. 11. As presented in the result 115, the maximum current perturbation reaches 595 mA, which is 19% over the nominal output current; the minimum current dip is 420 mA, which is 16% below the target value.

The current-sharing topology can be very useful for a multi-channel LED lighting application. Different channels can drive different numbers of LEDs with different current. Moreover, compared to a traditional multi-channel LED driver, a current-sharing topology can greatly reduce the number of power components needed, such as power inductors, freewheeling diodes, and even MOSFET if powering LEDs with unbalanced forward voltage.

In this embodiment, a controller regulating a three-channel current-sharing topology-based LED driver was described. This design shows quick start-up performance; moreover, due to the buck regulator being integrated inside the controller, the output current start-up overshooting is below the nominal value. The feedback circuit can control the output current well, and the maximum and minimum values of perturbation are less than 30% of the target value.

In this embodiment, if a duty cycle of one channel is changed, the duty cycles of the other channels would also change in order to maintain a unity total duty cycle. The current is fixed and the duty cycle is adjustable.

In a second embodiment a multi-channel current sharing circuit incorporates a buck operating at a multilevel output current. Each channel operates at a fixed frequency and a fixed and equal duty cycle. Each channel has a same switching frequency and a same duty cycle. For example, if the number of channels were three, the three corresponding PWM signals would have 120 degrees difference with no overlap. When a particular channel is on, the buck is controlled to be three times the channel nominal current.

Figure 12:
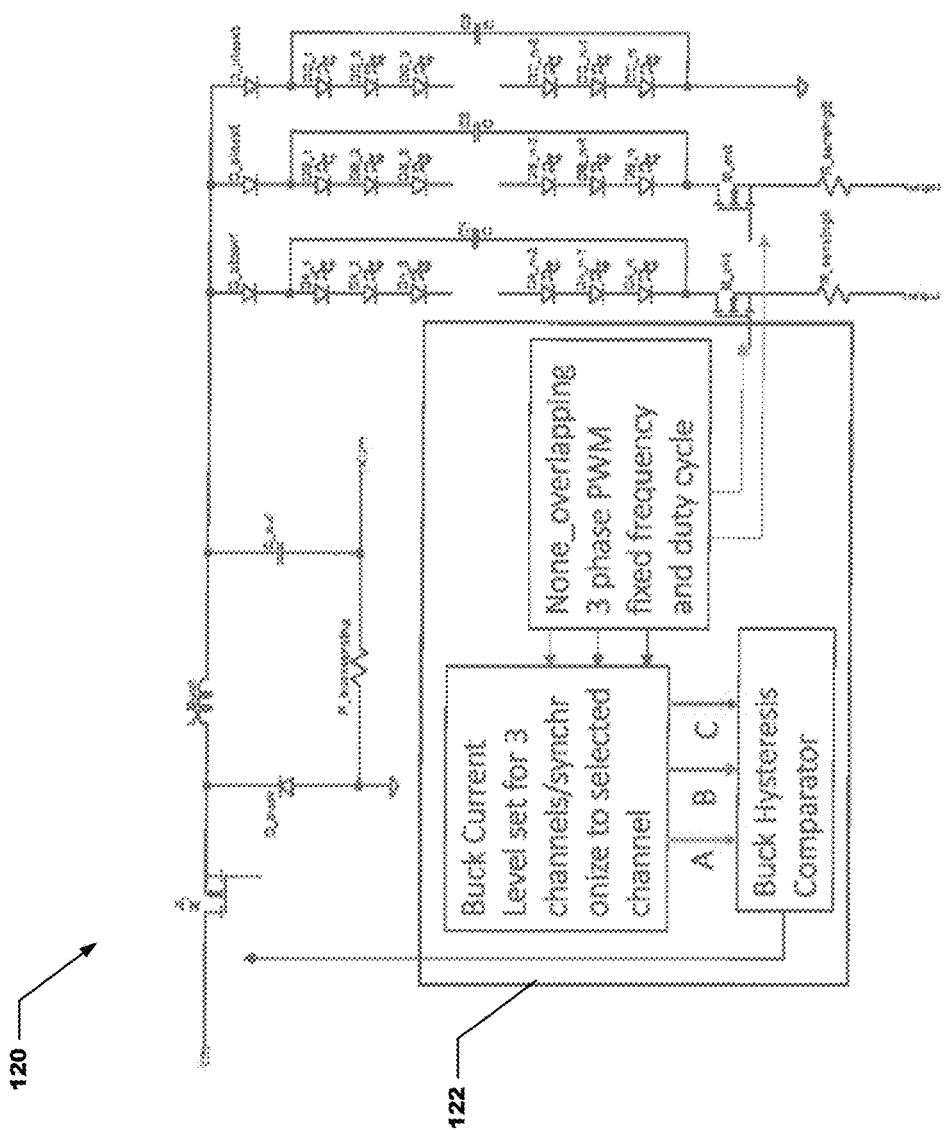
FIG. 12 depicts a schematic of a second embodiment of a multiple channel current sharing circuit in accordance with embodiments of the present invention.

As opposed to the shared duty cycle of the first embodiment, this embodiment the duty cycles are fixed. There is no feedback in this embodiment. The PWM is fixed and the current is variable. Referring to FIG. 12, a schematic 120 is shown which includes a multiple channel current sharing circuit 122. The circuit 122 includes a Buck circuit having a current level set for multiple channels that are synchronized to a selected channel. Also shown is a non-overlapping three phase PWM having a fixed frequency and a fixed duty cycle. A buck hysteresis comparator is also shown.

Figure 13:
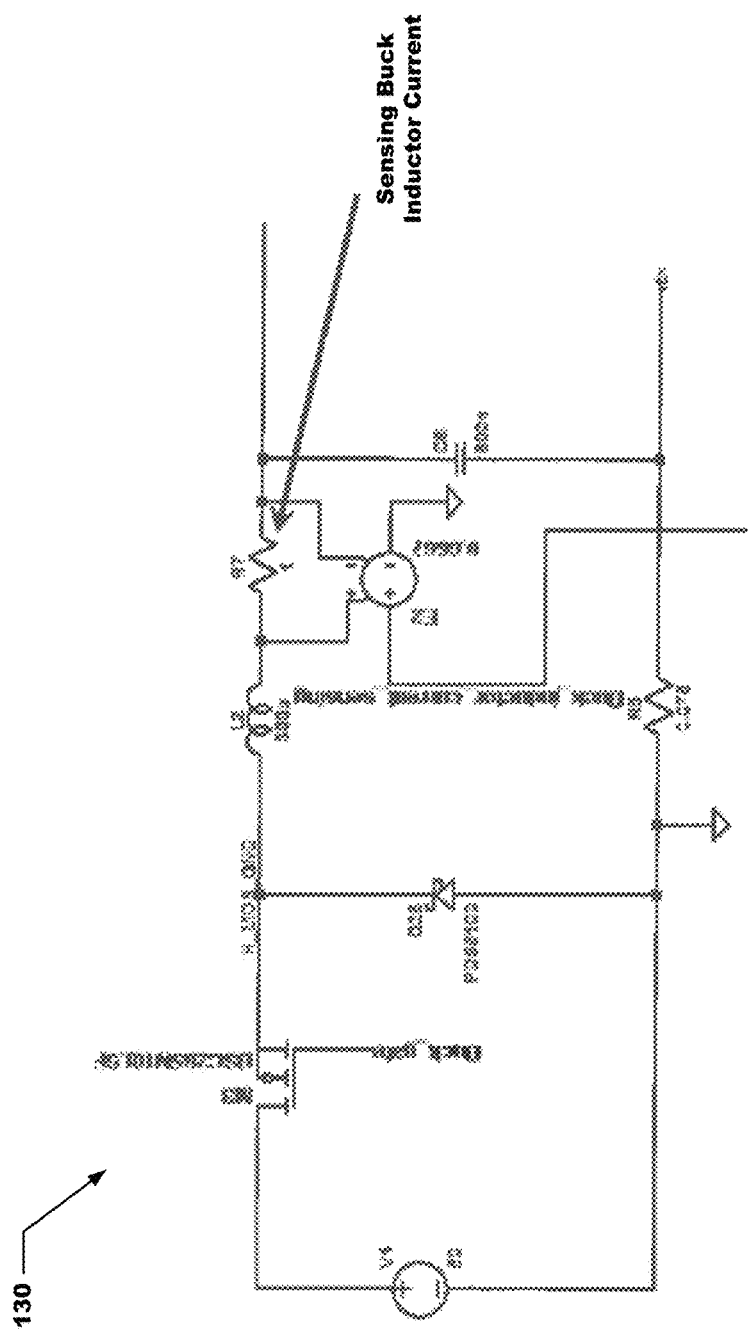
FIG. 13 depicts a schematic of a buck circuit in accordance with embodiments of the present invention.
Figure 14:
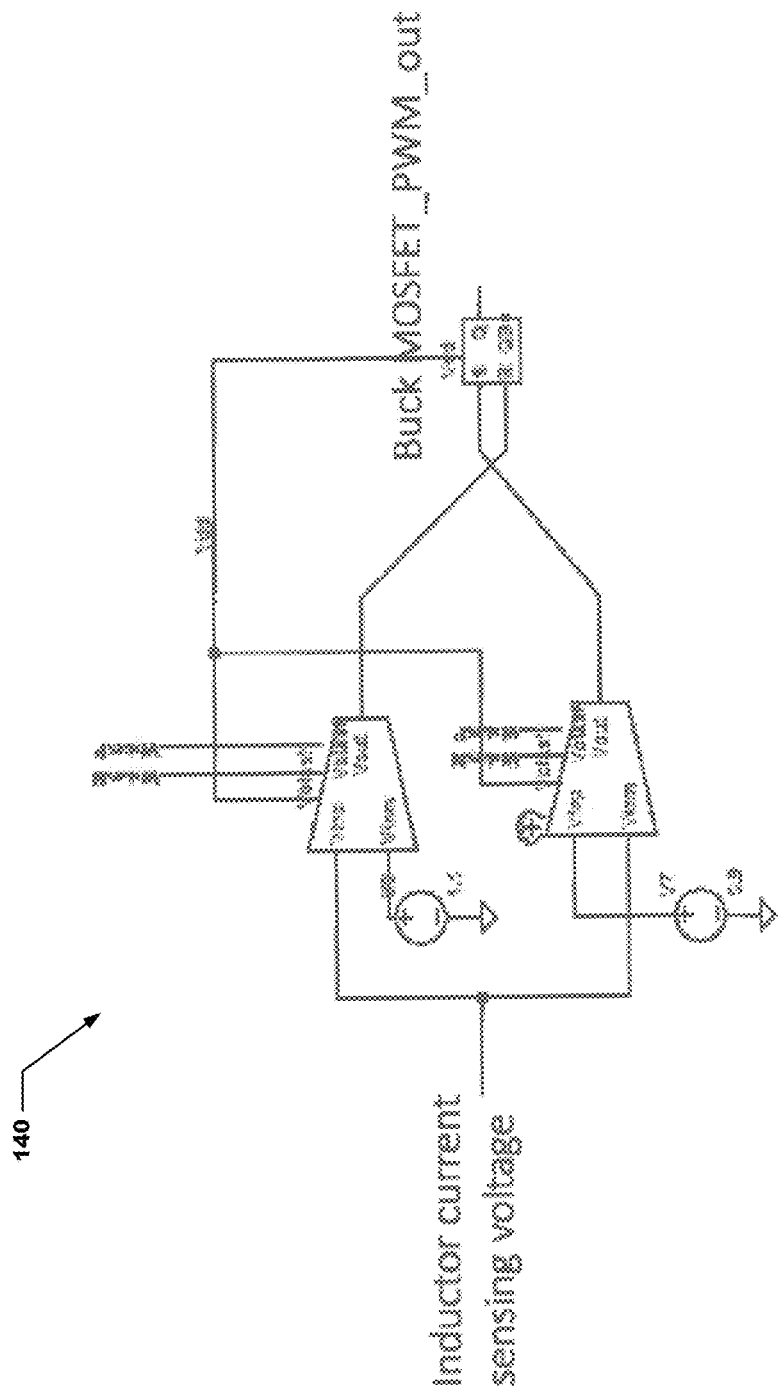
FIG. 14 depicts a schematic of a buck hysteresis comparator in accordance with embodiments of the present invention.

FIG. 13 shows a schematic 130 of the buck circuit. FIG. 14 shows a schematic 140 of the buck hysteresis comparator which uses the inductor current sensing voltage from the buck circuit to define a PWM output using hysteresis as the control mechanism. This serves to limit the peak current level and limit the minimum current level. Also, feedback is not required for the hysteresis control mechanism.

Figure 15:
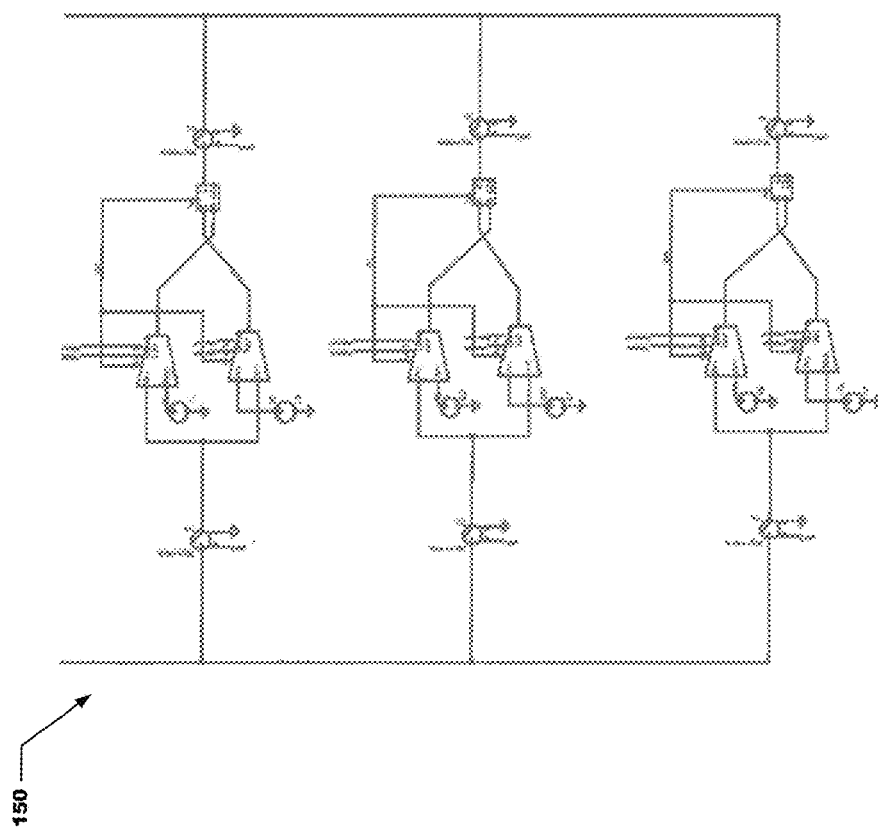
FIG. 15 depicts a schematic of three buck hysteresis comparators connected in parallel in accordance with embodiments of the present invention.
Figure 16:
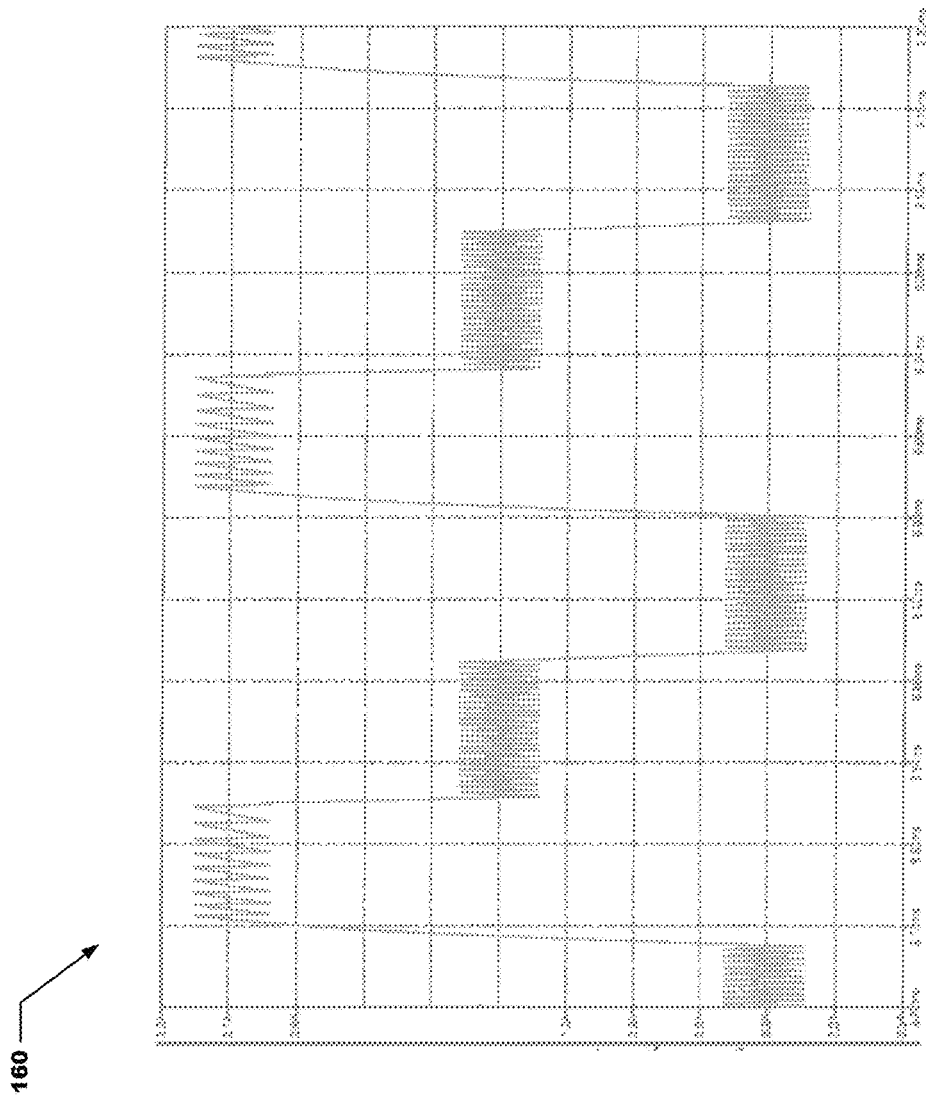
FIG. 16 depicts a graph showing the current passing through the buck inductor in accordance with embodiments of the present invention.
Figure 17:
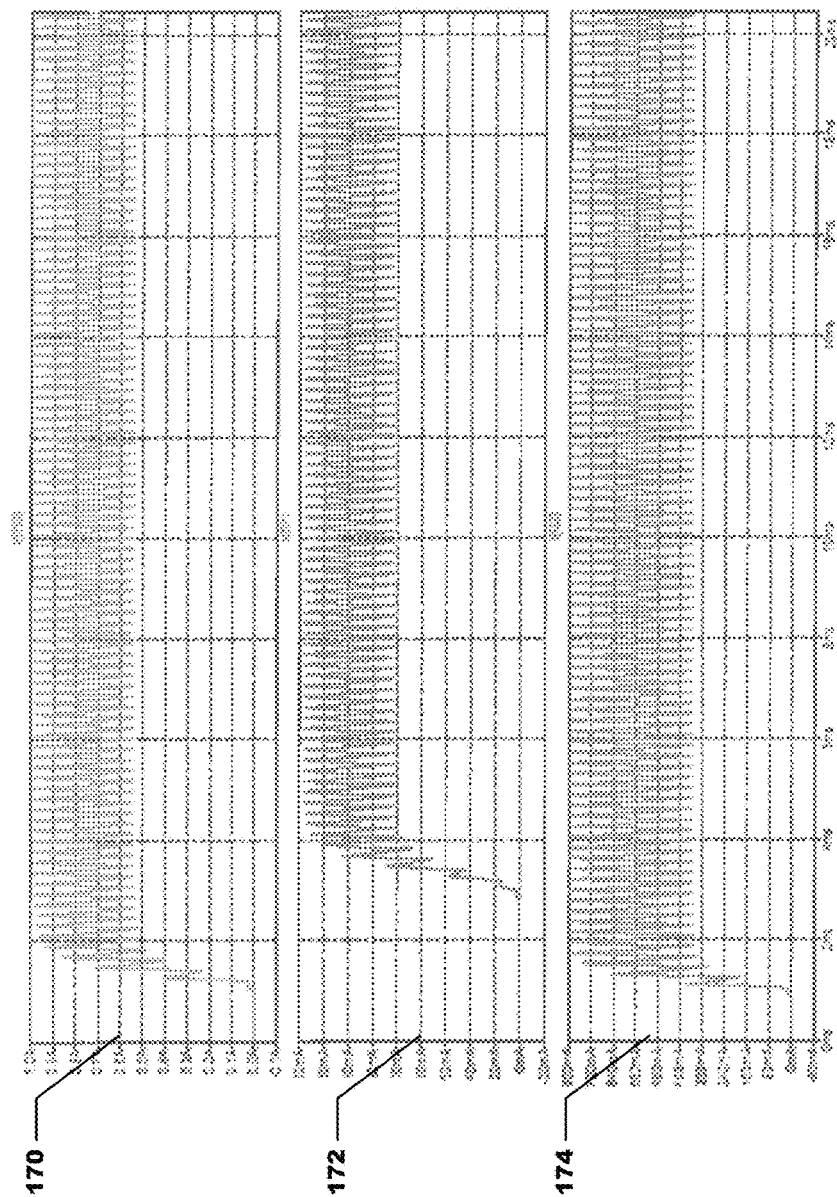
FIG. 17 depicts a graph showing the current passing through each LED string in accordance with embodiments of the present invention.

FIG. 15 shows the buck current control methodology. In this example three buck hysteresis comparators are connected in parallel to produce the waveform shown in FIG. 16. The waveform 160 is the current passing through the buck inductor. There are three level differences. One for each channel and having the same duration. Further, with no feedback required, regulation is fast. FIG. 17 shows the current passing through each LED string. It should be noted that only high current ripple exists.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A multi LED string controller with independent current setting for each string comprising:
   at least one of a constant current buck or linear generator, having an output;
   a pulse width modulation (PWM) generator providing a plurality of PWM outputs;
   a ratio decision circuit in communication with the PWM generator;
   a ratio adjust circuit in communication with the PWM generator and having a plurality of inputs; and
   wherein the current sharing controller circuit provides a fixed total current with a non-overlapping variable duty cycle at the plurality of PWM outputs, the plurality of PWM outputs driving a plurality of channels, each channel including a plurality of LEDs and the ratio adjust circuit plurality of inputs provide feedback from the plurality of channels.

2. The multi LED string controller circuit of claim 1, wherein the constant current buck generator comprises:
   a low pass filter (LPF) having an input and an output;
   an amplifier circuit having an input coupled to the output of the LPF and having an output;
   a compensation circuit having a first input coupled to the output of the amplifier circuit, having a second input, and having an output;
   a first switch having a first lead coupled to the second input of the compensation circuit, a second lead coupled to an initial reference voltage source, and a control for selectively coupling the voltage from the initial reference voltage source to the first lead;
   a second switch having a first lead coupled to the second input of the compensation circuit, a second lead coupled to a steady state reference voltage source, and a control for selectively coupling the voltage from the steady state reference voltage source to the first lead;

a comparator having a first input coupled to the output of the compensation circuit, a second input coupled to a reference waveform generator, and an output; and an offchip gate driver having an input coupled to the output of the comparator and having an output.

3. The multi LED string controller circuit of claim 2, wherein the amplifier circuit comprises:
a first operational amplifier (op-amp) having a first input coupled to the amplifier circuit input, a second input, and an output coupled to the amplifier circuit output;
a first resistor having a first lead coupled to the first op-amp output and a second lead coupled to the first op-amp second input; and
a second resistor having a first lead coupled to the first op-amp second input and having a second lead coupled to a ground.

4. The multi LED string controller circuit of claim 2, wherein the compensation circuit comprises:
a third resistor having a first lead coupled to the compensation circuit first input, and a second lead;
a second op-amp having a first input coupled to the first lead of the third resistor a second lead coupled to the second input of the compensation circuit and an output coupled to the compensation circuit output; and
a compensation element having a first lead coupled to the first input of the second op-amp and a second lead coupled to the output of the second op-amp.

5. The multi LED string controller circuit of claim 1, wherein the PWM generator comprises a plurality of PWM cells, each PWM cell comprising:
a first switch having a first lead coupled to a charging circuit, a second lead, and a control;
a second switch having a first lead coupled to the second lead of the first switch, a second lead coupled to a discharging circuit, and a control;
a charging capacitor having a first lead coupled to the first lead of the second switch and a second lead coupled to ground;
a first comparator having a first input coupled to the first lead of the charging capacitor, having a second lead coupled to a first reference voltage, and having an output;
a second comparator having a first input coupled to the first lead of the charging capacitor, having a second lead coupled to a second reference voltage, and having an output; and
a flip flop having a set input coupled to the output of the second comparator, having a reset input coupled to the output of the first comparator, having a first output coupled to the control of the first switch, and having a second output coupled to the control of the second switch.

6. The multi LED string controller of claim 1, wherein the constant current buck regulator is capable of driving a buck circuit and of controlling a plurality of channels of LEDs.

7. The current sharing controller of claim 6, wherein the buck controller comprises:
a voltage source having a first lead and having a second lead coupled to a ground;
a buck circuit switch having a source coupled to a first lead of the voltage source, a gate coupled to the output of the constant current buck regulator, and a drain;
a diode having an anode connected to ground and a cathode couples to the drain of the buck circuit switch;
an inductor having a first lead coupled to the cathode of the diode and a and a second lead comprising a buck circuit output;

an output capacitor having a first lead connected to the second lead of the inductor and a second lead connected to a return output; and
a sense resistor having a first lead connected to ground and a second lead connected to the second lead of the output capacitor.

8. The multi LED string controller of claim 6, wherein each channel of the plurality of channels of LEDs comprises:
a plurality of LEDs connected serially;
a channel capacitor having a first lead coupled to a cathode of a first one of the plurality of LEDs connected serially and a second lead coupled to a cathode of a last one of the plurality of LEDs connected serially;
a channel switch having a source connected to the second lead of the channel capacitor; a gate couple to one of the PWM generator outputs, and a drain; and
a channel resistor having a first lead coupled to the drain of the channel switch and a second lead coupled to a second lead of the output capacitor.

9. The multi LED string controller of claim 1, wherein the PWM is analog derived.

10. The multi LED string controller of claim 1, wherein the PWM is digitally derived.

11. A multi LED string controller circuit comprising:
a buck current level circuit having a plurality of outputs and a plurality of inputs;
a pulse width modulation (PWM) generator providing a plurality of PWM outputs and in communication with the buck current level circuit; and
a buck hysteresis comparator having an output and in communication with the buck current level circuit;
wherein the current sharing controller circuit provides a fixed frequency and fixed duty cycle signal with a non-overlapping duty cycle at the plurality of PWM outputs, the plurality of PWM outputs driving a plurality of channels, each channel including a plurality of LEDs.

12. The multi LED string controller of claim 11, wherein the buck hysteresis comparator comprises:
a first hysteresis comparator having a first input coupled to an inductor current sensing voltage, a second input coupled to a first voltage reference, a first positive threshold value input, a first negative threshold value input and an output;
a second hysteresis comparator having a first input coupled to a second voltage reference, a second input coupled to the first hysteresis comparator first input, a first positive threshold value input, a first negative threshold value input and an output; and
a flip flop having a set input coupled to the output of the second hysteresis comparator, having a reset input coupled to the output of the first hysteresis comparator, and having a first output.

13. The multi LED string controller circuit of claim 12, wherein the circuit includes a plurality of buck hysteresis controller wherein a first buck hysteresis controller of the plurality of buck hysteresis controllers is coupled in parallel with at least one other buck hysteresis controller.

14. The multi LED string controller of 11, wherein the constant current buck regulator is capable of driving a buck circuit and of controlling a plurality of channels of LEDs.

15. The multi LED string controller of claim 14, wherein the buck controller comprises:
a buck circuit switch having a source coupled to a voltage source, a gate coupled to the output of the current sharing controller, and a drain;

a diode having an anode connected to ground and a cathode couples to the drain of the buck circuit switch;

an inductor having a first lead coupled to the cathode of the diode and a second lead comprising a buck circuit output;

an output capacitor having a first lead connected to the second lead of the inductor and a second lead connected to a return output; and a sense resistor having a first lead connected to ground and a second lead connected to the second lead of the output capacitor.

16. The multi LED string controller of claim 14 wherein each channel of the plurality of channels of LEDs comprises:

a plurality of LEDs connected serially;

a channel capacitor having a first lead coupled to a cathode of a first one of the plurality of LEDs connected serially and a second lead coupled to a cathode of a last one of the plurality of LEDs connected serially;

a channel switch having a source connected to the second lead of the channel capacitor; a gate couple to one of the PWM outputs, and a drain; and a channel resistor having a first lead coupled to the drain of the channel switch and a second lead coupled to a second lead of the output capacitor.

* * * * *